United States Patent Office 3,449,065
Patented June 10, 1969

3,449,065
METHOD OF SEPARATION OF RADIUM
Marcelle Kremer, Ermont, France, assignor to Commissariat à l'Energie Atomique, Paris, France
No Drawing. Filed May 8, 1964, Ser. No. 366,185
Claims priority, application France, May 28, 1963, 936,318
Int. Cl. C01f *13/00*
U.S. Cl. 23—22
9 Claims

ABSTRACT OF THE DISCLOSURE

The present invention relates to a method of removal of radium by physicochemical process from radioactive liquids and especially effluents which are derived from the treatment of uranium-bearing ores. The method comprises the steps of adding to said effluent a solution of a soluble barium salt and a solution of at least one fatty acid salt. After precipitation of the solids formed, the solids are separated from the supernatant remaining. The preferred barium salt is barium chloride and preferably both solutions added to the effluent are aqueous solutions.

---

Radium is one of the radio-nuclides in which the standards of rejection are the most stringent ($1.10^{-10}$ Ci/l.) and, in consequence, must be removed by a method which is both rapid and effective.

Barium sulphate has proved to be an effective and economic decontamination agent and its action is increased when it is precipitated in solutions. When precipitated with barium sulphate, radium can thus be removed from effluents by filtration. The extraction efficiency is higher than 99% and is not influenced by the pH value of the effluent between pH1 and pH11.

Unfortunately, barium sulphate precipitates into very fine crystals which cannot readily be decanted, thereby making the process of removal of radium extremely slow.

The present invention has for its object a method of extraction of radium from radioactive effluents which permits of rapid removal of this radio-nuclide. The invention essentially consists in adding to the radioactive effluent a solution of a barium salt and a solution of at least one fatty acid salt.

A fatty acid is preferably chosen with a linear chain having a number of carbon atoms which is comprised between 15 and 18.

The addition of the fatty acid solution can be performed either prior to or after the addition of the barium salt or at the same time as this latter.

In accordance with the method which is contemplated by the present invention, there are added in suitable proportions a barium salt in the form of chloride, for example, and a sodium solution of a fatty acid or a soapy solution to a quantity of effluents which are charged with calcium sulphate.

The effluents referred-to can consist of the residual liquor which results from the attacking action of sulphuric acid on a uranium ore, from the neutralization of sterile material by the attacking action of lime and from the precipitation of uranium in the form of uranate.

There accordingly takes place in the midst of the reaction medium the precipitation of an insoluble fatty acid salt which causes the crystals of barium sulphate to adhere together and form an agglomerate. The precipitate has the appearance of large flakes which separate rapidly.

The concentration of the soapy solution or sodium salt of fatty acid is chosen in such a manner as to ensure that precipitation takes place and not flotation.

Decontamination can advantageously be performed in a settling tank of small size, the precipitate which is deposited at the bottom of the tank being periodically removed.

There is obtained in all cases a supernatent solution having a radium content which is below maximum permissible levels.

Three examples of practical application of the method will now be given below without implied limitation and will bring out more clearly the advantages which are offered by the method of removal of radium according to the invention.

EXAMPLE 1

The starting material employed was one liter of radioactive effluent containing $400.10^{-12}$ Ci/l. of radium and which, as a direct result of the treatment of the ore (attack by sulphuric acid, neutralization of sterile material by the attacking action of lime), contained a solution of calcium sulphate. There was added to this effluent 50 mg. of barium chloride ($BaCl_2$, $2H_2O$) in aqueous solution. After formation of barium sulphate, that is to say after a period of five minutes, there was added to the aggregate 10 mg. of Marseilles soap in aqueous solution. After one-half hour of slow agitation, the precipitate agglomerated into flakes which fell at a rate of 1.5 m./hour. The radium content of the effluent as measured after decantation had fallen to a value of $2.10^{-12}$ Ci/l., namely a value below the maximum permissible levels.

EXAMPLE 2

The starting material employed was the same radioactive effluent as that of Example 1 and was processed under the same conditions except that the 10 mg. of Marseilles soap were replaced by 15 mg. of sodium stearate. Identical results were obtained.

The same experiments were repeated without addition of either Marseilles soap or stearate. The rate of flocculation fell to 6.5 cm./hour. The addition of conventional flocculating agents such as Flocgel, bone glue, Dealca did not produce any increase in the flocculation rate.

EXAMPLE 3

The starting material employed was one liter of a radioactive effluent containing $918.10^{-12}$ Ci/l. of radium and taken from the residual liquor which results from the attacking action of sulphuric acid on a uranium ore, from the neutralization of sterile materials by the attacking action of lime and from the precipitation of uranium in the form of uranate.

There were added to the effluent 50 mg. of barium chloride ($BaCl_2$, $2H_2O$) in an aqueous solution containing 50 g./l. After 3 to 5 minutes of agitation of the mixture, when the barium sulphate precipitated, there was added within this medium 10 mg. of sodium oleate in a solution containing 1 g./l. in permuted water.

The mixture was agitated for a period of one-half hour, which is the time necessary for the coalescence of crystals of barium sulphate.

The rate of decantation of the precipitate was in this case 1.4 m./hr.

The radium content of the effluent as measured after decantation was $4.1.10^{-12}$ Ci/l.

What I claim is:

1. A method for removing radium from a radium containing radioactive effluent charged with calcium which comprises the steps of adding to said effluent a solution of a soluble barium salt and a solution of at least one fatty acid salt, said solutions being added in sufficient quantity to form a precipitate which is capable of settling and separating the precipitate formed from the remaining solution.

2. A method according to claim 1 wherein said radioactive effluent is derived from a sulfuric acid treatment of uranium ore.

3. A method according to claim 1 wherein said radioactive effluent is derived from a process where uranium is precipitated in the form of uranate.

4. A method according to claim 1 wherein the fatty acid portion of the salt is composed of a linear chain of from 15 to 18 carbon atoms.

5. A method according to claim 1 wherein the soluble barium salt is barium chloride.

6. A method according to claim 1 wherein the concentration of the fatty acid salt in solution is such that precipitation of the fatty acid salt formed takes place.

7. A process according to claim 1 wherein the fatty acid salt is selected from the group consisting of sodium stearate and sodium oleate and the barium salt is barium chloride.

8. A method according to claim 1 wherein the solution of the barium salt and the solution of the fatty acid salt are both aqueous solutions.

9. A method according to claim 1 wherein the fatty acid salt is an alkali metal salt of the fatty acid.

References Cited

UNITED STATES PATENTS

| | | | |
|---|---|---|---|
| 1,588,383 | 6/1926 | Fleck | 23—23 |
| 2,000,656 | 5/1935 | Armstrong et al. | 23—20 |
| 2,442,429 | 6/1948 | Nye et al. | 23—18 X |

EARL C. THOMAS, *Primary Examiner.*

H. T. CARTER, *Assistant Examiner.*

U.S. Cl. X.R.

23—122; 252—301.1